March 14, 1967

W. O. STANTON 3,309,094

PHONOGRAPHIC TURNTABLE ASSEMBLY

Filed May 18, 1964

INVENTOR.
WALTER O. STANTON

BY

Kane, Dalsimer & Kane
ATTORNEYS

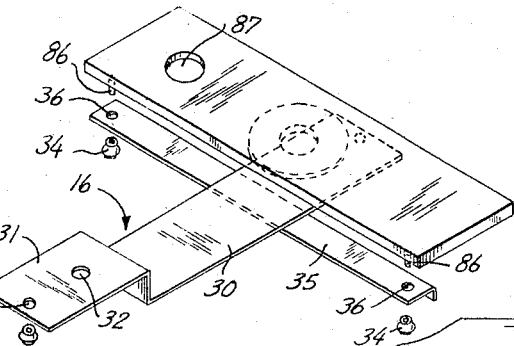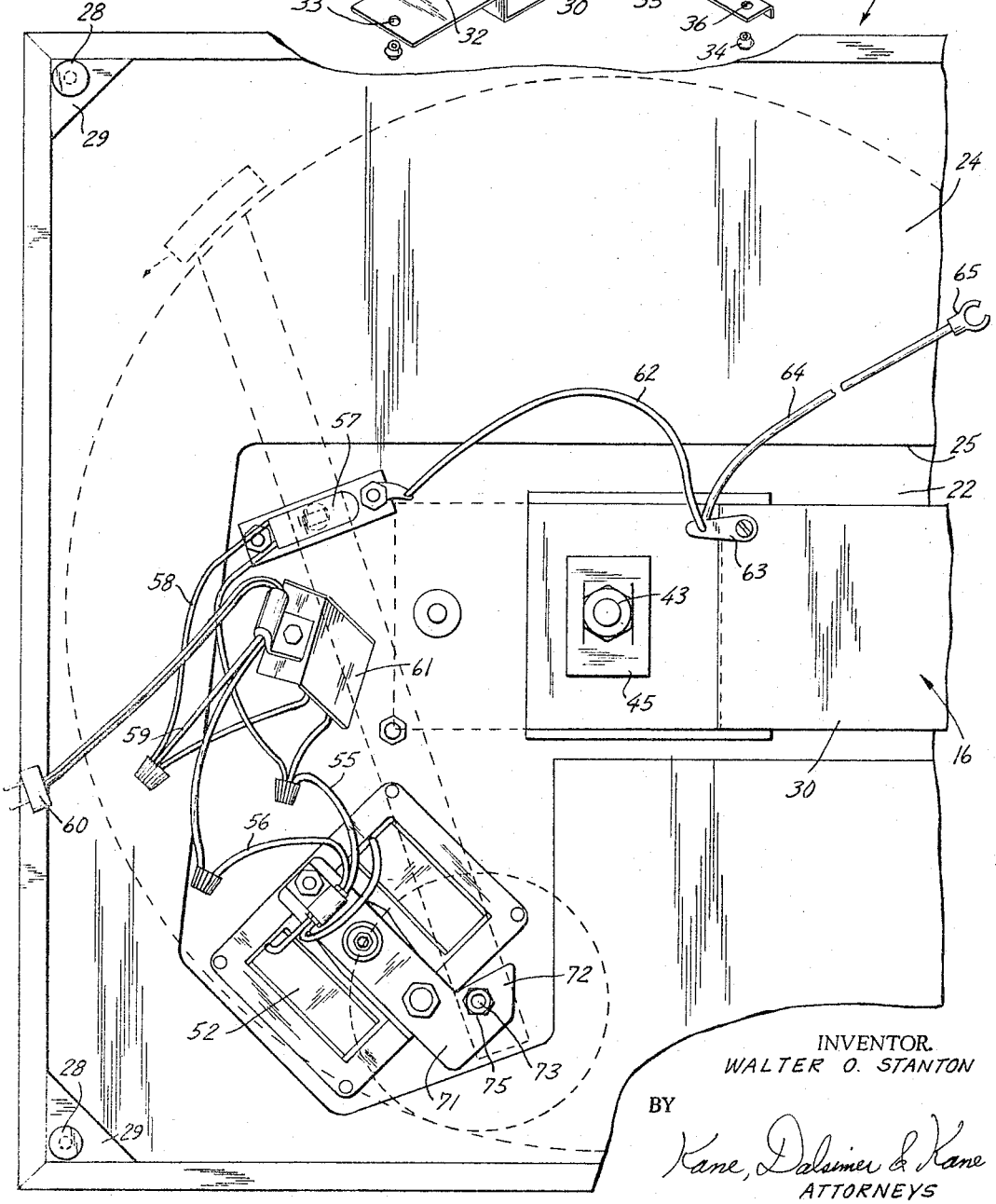

March 14, 1967 W. O. STANTON 3,309,094
PHONOGRAPHIC TURNTABLE ASSEMBLY
Filed May 18, 1964 4 Sheets-Sheet 4
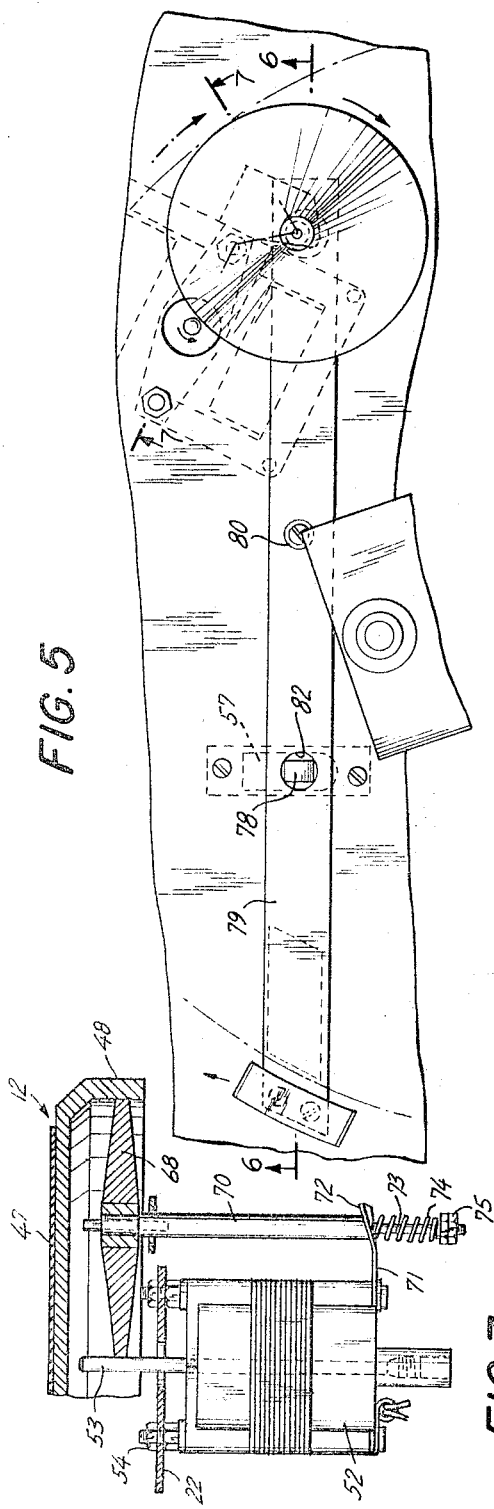
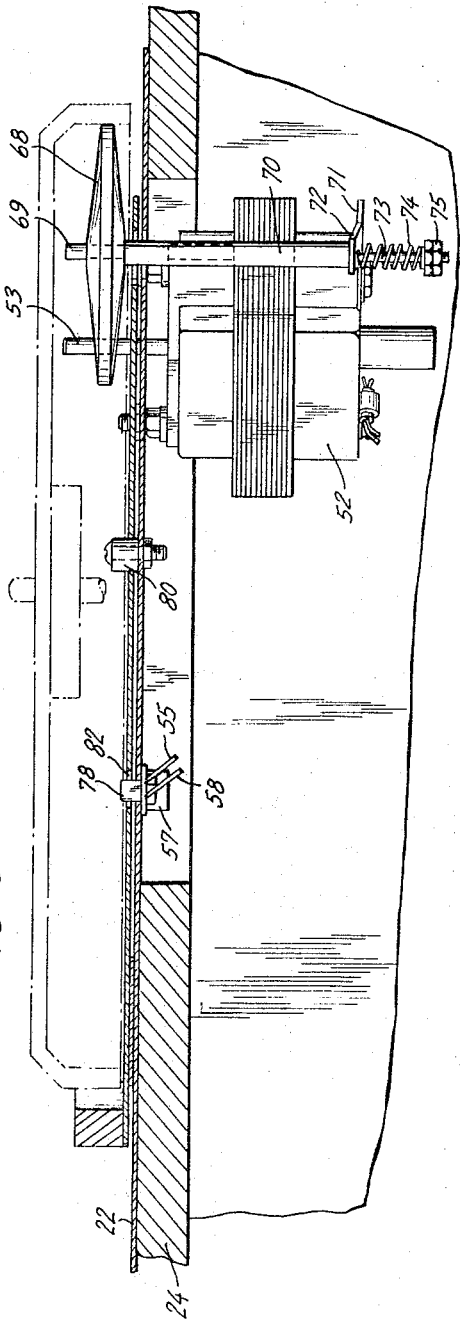
INVENTOR.
WALTER O. STANTON
BY
Kane, Dalsimer & Kane
ATTORNEYS

United States Patent Office 3,309,094
Patented Mar. 14, 1967

3,309,094
PHONOGRAPHIC TURNTABLE ASSEMBLY
Walter O. Stanton, Laurel Hill Road,
Laurel Hollow, N.Y. 11101
Filed May 18, 1964, Ser. No. 368,015
6 Claims. (Cl. 274—39)

This invention relates to an improved photograph turntable assembly.

It is an object of the present invention to provide an improved turntable assembly for use in playing phonographic disc recordings having an improved mounting whereby the turntable is stable and may rotate around a fixed center in a fixed plane with minimum friction. At the same time, it is isolated from vibration, particularly within the audio-frequency range, which would otherwise result in undesirable interference or distortion known as rumble.

A further object is the provision of an improved mounting for a turntable assembly of relatively simple but rugged construction which provides a stable support for the platen or turntable in a relatively fixed plane while at the same time performing a mechanical filtering function to prevent or minimize the transmission of vibration, particularly within the audio-frequency range to the platen.

Another object is the provision of an improved operating and control assembly for operating and controlling the operation of the turntable or platen, which is of relatively simple construction, is reliable in operation, and which isolates the turntable or platen from the vibrations of the operating motor and gearing, but nevertheless provides for a smooth rotation of the platen at a uniform rate of speed.

In carrying out my invention, I provide a turntable or platen mounting having three shock absorbing resilient supporting points providing maximum stability and minimum transmission of external vibrations within the audio range. I also provide improved control mechanism for the turnable or platen in the form of a pluck or rotor of flexible elastomeric material mounted on a shaft extending through a support with a cam surface and spring between the shaft and the support so as to normally urge the rotor into engagement with a drive shaft and the platen to cause the operation or rotation thereof. A pivotally mounted control arm is provided for controlling operation of a switch for the drive motor and this control arm is engageable with the shaft of the rotor for shifting the rotor out of engagement with the drive shaft and turntable when the switch is shut off.

My improved turntable or platen mounting also includes a bearing assembly for the platen which per se serves as a filter to further isolate the platen from vibrations in the audio range.

In the accompanying drawings:

FIG. 4 is a perspective view of an improved mounting member for the platen providing a three point support or suspension together with a mounting panel for supporting a tone arm;

FIG. 5 is a detailed, fragmentary, plan view of the control and operating assembly for operating or rotating the platen;

FIG. 6 is an elevational, sectional view of the control and operating assembly in the direction of the arrows on the line 6—6 of FIG. 5;

FIG. 7 is a detailed view of the operating motor, drive shaft, operating rotor and associated parts in the direction of the arrows on the line 7—7 of FIG. 5; and FIG. 8 is a partially fragmentary, bottom plan view of the turntable assembly showing the supporting base, a portion of the mounting member, the drive motor and the electrical wiring.

Figure 1:
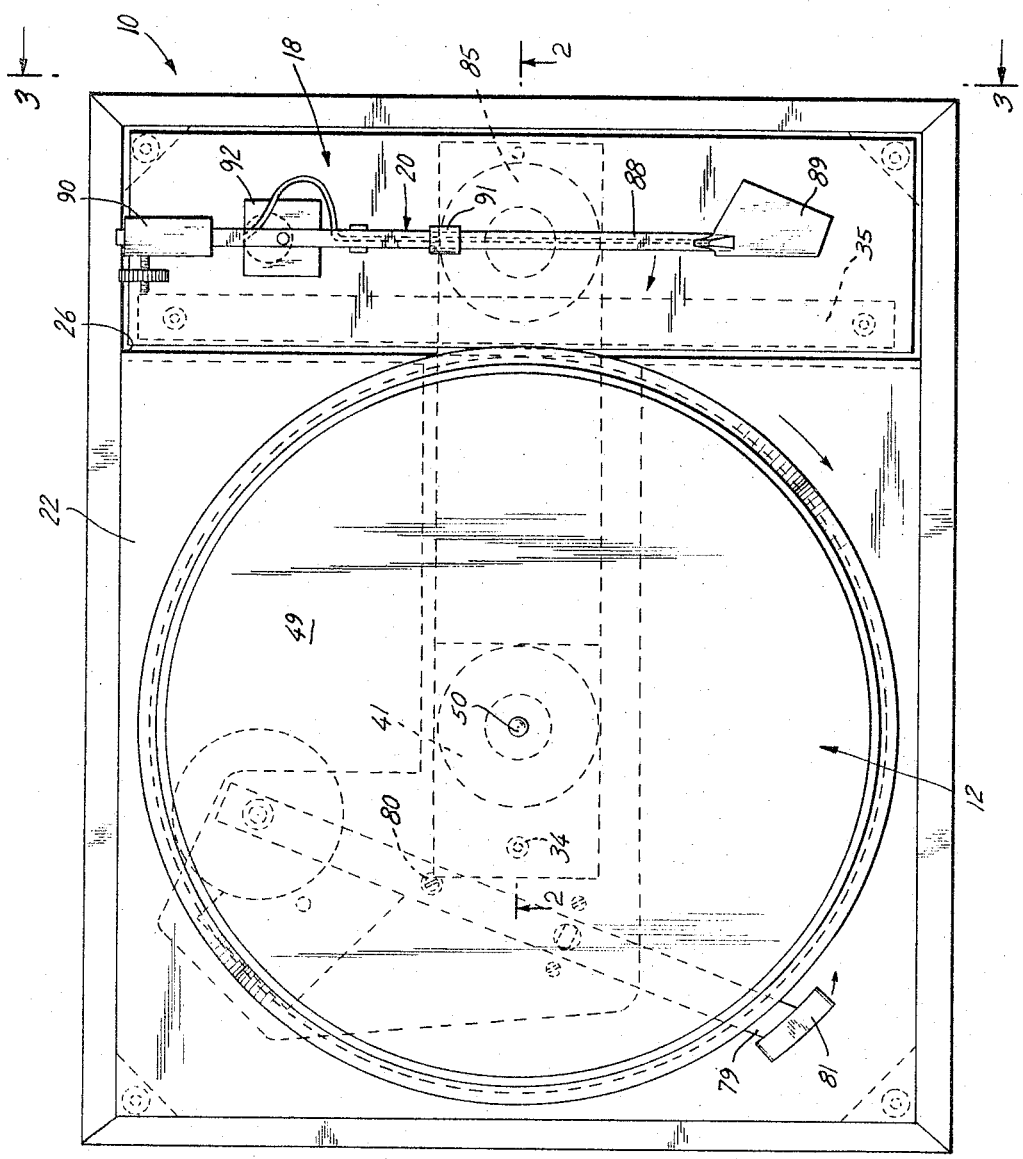
FIG. 1 is a top plan view of a turntable assembly embodying my invention.

My improved turntable assembly comprises a supporting base shown generally at 10, a rotatable platen or turntable 12, a bearing assembly shown generally at 14 for supporting the platen for rotary motion, and a mounting member 16 supporting the bearing assembly and platen and having a three point resilient support on the supporting base so as to be stable and at the same time minimize the transmission of vibrations within the audio range to the platen. My improved turntable assembly may also include a panel member 18 supporting a tone arm assembly shown generally at 20.

The supporting base may take the form of a casing having four side walls joined together at the corners as shown, and arranged in a generally rectangular configuration. The casing is preferably open at the bottom and has a top plate 22 extending over the major portion of the top with an opening 23 adjacent its central portion through which the platen mounting and a portion of the bearing assembly may extend. The top plate 22 terminates short of the right-hand end of the casing or base support, as viewed in FIGS. 1 and 2, and the tone arm mounting board or panel 18 is disposed in the space between the end of the casing and the end of the top plate. The top plate 22 is supported on and extends over a panel board 24 secured between the upper ends of the side walls of the casing and left-hand wall, as viewed in FIG. 1. The panel or board 24 has a cut out area 25 extending through the central portion exposing the undersurface of the top plate 22 and of the aperture 23 extending therethrough. The motor assembly, switch assembly, control arm, etc. are mounted directly on the top plate and the panel or board 24 lends additional support thereto.

Figure 2:
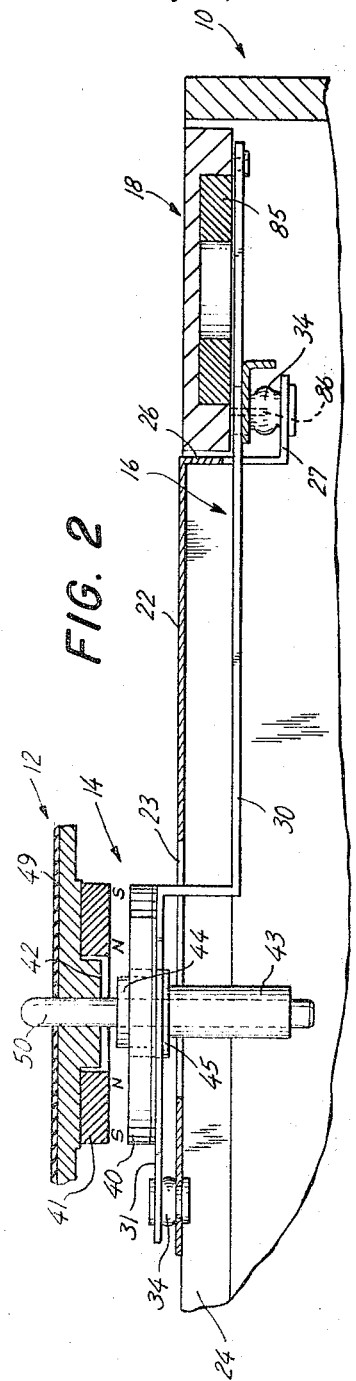
FIG. 2 is a fragmentary, longitudinal, sectional view in the direction of the arrows on the line 2—2 of FIG. 1.
Figure 3:
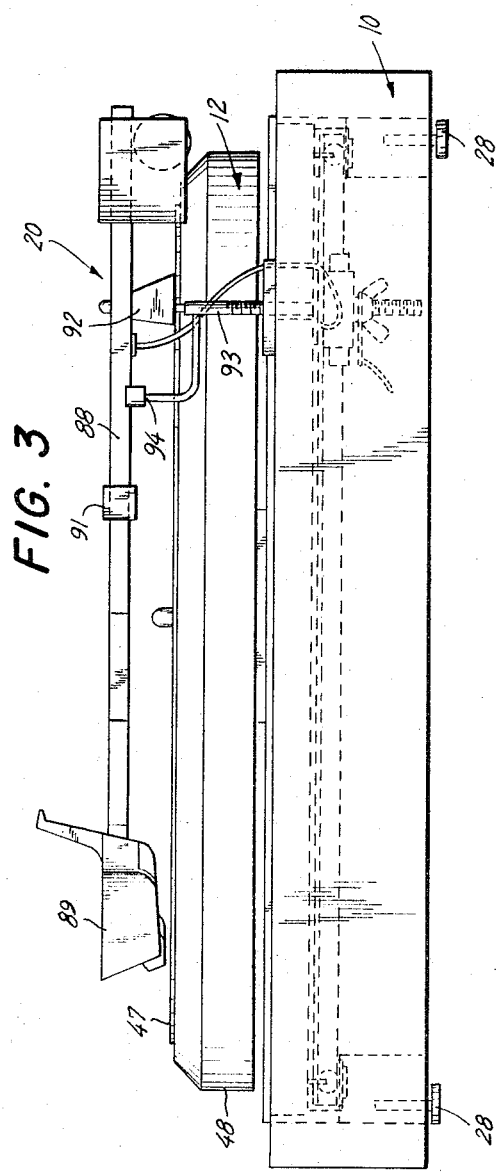
FIG. 3 is an end elevational view of the turntable assembly in the direction of the arrows on the line 3—3 of FIG. 1.

At the right-hand end of the turntable assembly, as viewed in FIGS. 1 and 2, the top plate 22 is folded or bent downwardly to provide a flange 26 extending transversely of the casing. At each of its opposite ends, the flange 26 is formed with a depending angle bracket 27 serving as a supporting point for the mounting member 16.

Adjacent the four corners of the casing or supporting base and extending downwardly therefrom are the adjustable supporting lugs 23. The supporting lugs are in the form of externally threaded screws having enlarged heads and engaging the corner brackets 29. The heads of the supporting lugs engage the supporting surface. It will be appreciated that the lugs can be individually adjusted to provide firm, stable, level support for the assembly.

The casing 10 may be of any desired material to impart an attractive appearance thereto, and for this purpose, I prefer to employ wood or plastic. The panel or board 24 may likewise be made of wood or plastic and the top plate 22 is preferably made of metal.

The mounting member 16 preferably comprises a longitudinally extending arm or plate 30 having a first end portion 31 which is upwardly off-set from the remainder of the arm. The end portion 31 extends outwardly through the aperture 23 in the top plate 22, and it is disposed in a plane above the top plate. The remainder of the arm 30 is disposed beneath the top plate 22, as shown most clearly in FIG. 2, and extends outwardly beyond the flange 26 on the right-hand of the assembly, as viewed in FIGS. 1 and 2. The first end portion 31 has a relatively larger aperture 32 extending therefrom for accommodating a portion of the mounting for the bearing assembly, as shown in FIG. 2, and as will be later explained. The end portion 31 of the supporting member also has a relatively small aperture 33, for engaging a flexible resilient supporting member 34 mounted in the top plate 22. The supporting member 34 is made of an elastomeric flexible material, such as rubber, synthetic rubber or the like. The elastomeric member may take different forms. I prefer to employ a tubular grommet made of elastomeric material and provided with a central body portion and with a groove and flange adjacent each end thereof, as shown most clearly in FIGS. 2 and 4. The groove and flange at the upper end of the grommet are assembled with the aperture 33 in the end portion 31 of the mounting member and the groove and flange at the lower end of the grommet is assembled with a similar aperture provided in top plate 22.

Thus, the end 31 of the mounting member is provided with a resilient, shock-absorbing, mounting point on top plate 22. The arm 30 of the mounting member at its opposite end extends to a point spaced from but adjacent the right end wall of the casing, as viewed in FIGS. 1 and 2. In this connection, it will be seen that the arm 30 extends beneath the flange 26 beneath the top plate and is spaced therefrom. Shortly beyond the flange 26, the supporting member is provided with a cross arm 25 welded or otherwise secured to the arm 30 and disposed at right angles thereto. The cross arm 35 extends transversely of the casing and terminates a short distance from the opposite side walls thereof.

The cross arm 35 is preferably in the form of an angle iron to provide rigidity thereto. Adjacent its two ends, the cross arm is provided with apertures 36 extending therethrough for receiving the upper end portions of resilient supporting members 34. The resilient supporting members are grommets of elastomeric material and are similar to the grommets previously described. The lower end of the grommets extends through apertures provided in the angle brackets 27 formed adjacent the two opposite ends of the flange 26.

Thus, the supporting member 16 is provided with three resilient shock absorbing points of support, three of which are arranged in generally triangular relationship. The three resilient points of support impart stability to the mounting, but help to prevent or minimize the transmission of vibrations to the platen supported on the supporting member as hereinafter described. The relationship between the compliance of the elastomeric grommets 34 and the mounting member 16 and mass supported thereon should be such that the natural period of vibration is outside of the audio range.

The raised end portion 31 of the mounting member serves as the support for the bearing assembly 14 and for the rotatable platen 12 mounted thereon. In this connection, I may use any type of bearing assembly for supporting the turntable or platen which provides for minimum friction. I prefer to employ a magnetic type of bearing assembly shown in Patent No. 3,044,784 granted on July 17, 1962, for "Turntable Assembly for Photographic Records."

Thus, I have shown a magnetic bearing in the form of two ring-shaped permanent magnets 40 and 41 mounted respectively on the upper surface of end portion 31 of the mounting member and on the under surface of the platen or turntable, and presenting opposing magnetic fields of sufficient strength to support the platen in spaced relationship so that it may freely rotate. The permanent magnets should be of a type having a high coercive force so that they will not readily become demagnetized when arranged in repelling relationship. For this purpose, I have found that highly coercive barium ferrite permanent magnets serve very satisfactorily, such as those which are commercially available under the name of Index V. from the Indiana Steel Products Co. of Valparaiso, Ind.

Very satisfactory results are obtained by polarizing or magnetizing the magnets so that the two poles of each magnet face towards the same surface with one pole being adjacent the inner periphery and the other pole being adjacent the outer periphery, as shown in FIG. 2. Thus, in ring magnet 41, the north and south poles face downwardly. In ring magnet 40, the poles are correspondingly located, but face upwardly so that the north and south poles of the respective magnets are in opposing confronting relationship.

The turntable 12 is provided with a central aperture and a downwardly projecting portion 42 surrounding the aperture and substantially filling the space inside the ring magnet 41. The ring magnet 41 is arranged concentrically around the central aperture of the turntable and also the boss 42 and is suitably held in place by being cemented to the under surface of the turntable. The ring magnet 40 is arranged concentrically with the aperture 32 on the end portion 31 of the mounting member and is also suitably secured in place as by being cemented.

The guide tube or socket 43 extends downwardly through the central aperture of ring magnet 40 and also through the aperture 32 of the mounting member. The enlarged collar portion 44 rests on the upper surface of the mounting member, and the spring lock nut 45 is disposed around the guide tube 43 on the under surface of the mounting member. Thus, the guide tube is firmly retained in place.

Turntable 12 is in the form of a circular disc made of a non-magnetic material, preferably a metal such as aluminum or magnesium, and has a depending peripheral flange 48. A mat 47 made of rubber or synthetic rubber is suitably secured to the upper surface of the platen as by a suitable adhesive and the record rests thereon while it is being played. Extending downwardly through the central aperture formed in the platen and suitably secured thereto is a spindle 50 which serves to retain the platen in properly centered position while it rotates and also to maintain the ring magnets in opposed confronting relationship. Thus, it will be seen that the spindle 50 extends downwardly through the centers of the ring magnets into the guide tube or socket 43. The spindle and the guide tube should be provided with suitable bearing surfaces so as to minimize friction upon rotation of the turntable.

The force of the opposing magnetic fields of the ring magnets should be sufficient to support the platen for rotation without physical engagement of the parts or support other than the opposing magnetic fields. Further, the mass of the supported turntable assembly relative to the force of the opposing magnetic fields should be such that the natural period of vibration of the assembly should be outside of the audio-frequency range.

The phonograph turntable is operated by means of an electric motor 52 of the uniformly rotating type such as a synchronous motor. Extending upwardly from the motor is a drive shaft 53, which is caused to rotate at a uniform rate of speed when the motor is in operation. The motor assembly is supported on the top plate 22 by suitable means, such as nuts and bolts, as shown at 54. Since the magnetic bearing and turnable assembly is supported on the mounting member, it will be seen that the platen is isolated from any vibrations caused by the motor.

The electric motor is suitably connected to a source of electric current by leads 55 and 56. Lead 55 connects with switch 57 which in turn is connected by leads 58 and 59 to plug 60. Lead 56 connects to plug 60. A click suppressor or filter 61 is preferably connected in the circuit, as shown. In operating the motor, the plug 60 is connected to a suitable outlet and the switch 57 is turned to "on" position.

It will be seen that switch 57 is mounted on top plate 22. A suitable ground connection for the top plate is connected to the switch mounting screw, as shown at 62. The ground connection 62 connects to a terminal 63 mounted on the mounting member which in turn is provided with ground connection 64 having clip 65 at its outer end for connection to the pivot post of the tone arm.

As previously pointed out, the turntable assembly is mounted so that it is isolated from external vibrations including vibrations of the motor. I also provide suitable transmission means for causing rotation of the platen which prevents the transmission of vibration from the motor. The transmission means comprises a rotor or puck 68 made of a flexible, resilient material, such as rubber, synthetic rubber, or other elastomeric material. The puck is mounted for free rotary movement adjacent the drive shaft 53 and the peripheral flange 48 of the turntable so that it may be shifted between inoperative position out of engagement with either the drive shaft or flange and operative position in engagement with both the drive shaft and flange. The rotor is shown in operative position in FIG. 5 and is shown in inoperative position in dotted lines in FIG. 1.

The rotor idler or puck is mounted on spindle 69 journaled for free rotary motion in the upper end of shaft 70. The shaft is supported by a bracket 71 having an angularly disposed cam surface 72 engaging a shoulder adjacent the lower end of the shaft so as to urge the shaft and rotor to operative position, with the rotor in engagement with the drive shaft and flange of the platen. Extending downwardly from the lower end of the shaft 70 is a reduced extension 73 having a helical spring 74 disposed therearound and provided with a pair of nuts 75 engaging the threaded lower end thereof. The extension 73 extends through an aperture in the cam portion 72 of bracket 71. The helical spring 73 extends between the nuts 75 and the under surface of the cam portion of the bracket exerting a force therebetween thereby causing the shaft 70 to tilt in the direction of the cam surface 72. In this connection, the shoulder between shaft 70 and the reduced lower end portion 73 is perpendicular to the axis of the shaft and the spring force urges the shoulder to seat against the cam surface. The spacing between the rotor 68, drive shaft 53, and flange 48 of the platen is such that when the rotor is in operative position, in engagement with the drive shaft and flange, the supporting shaft 70 of the rotor is preferably substantially in vertical position.

As previously pointed out, the force of spring 74 normally maintains the rotor in operative position. However, it may be readily shifted out of operative position by applying a force against the shaft 70 so as to cause it to tilt against the force exerted by the spring. When the phonograph turntable is not in use, it is desirable to move the rotor out of operative position so as to prevent the peripheral edges thereof from assuming a permanent set at the points of engagement with the drive shaft and flange.

The drive shaft and rotor may be shifted out of operative position by any desired type of control mechanism. I prefer to employ a control arm which simultaneously controls the operation of switch 57 at the same time as the rotor is shifted into or out of operative position. Thus I provide the switch 57 with an operating lever 78 which projects above top plate 22. I also provide an operating arm or lever 79 pivotally mounted above the top plate 22 as by means of the threaded stud assembly 80. The control arm 79 is positioned beneath the platen and is parallel to a chord located generally on the left side of the turntable assembly as viewed in FIGURE 1. The one end of the control arm projects beyond the edge of the platen and is provided with an operating handle 81.

By moving the control handle 81 through an arc to the right as viewed in FIGURE 1, the switch 57 is turned on and the rotor shifts to operative position. By moving the operating handle 81 through an arc to the left as viewed in FIGURE 1, the switch is turned off and the rotor is moved to inoperative position.

To accomplish this result, the control arm 79 is provided with an aperture 82 which is disposed over the operating lever 78 of the switch so that when the control arm is moved to the left, the switch handle is shifted to "off" position and when the control arm is shifted to the right, the switch handle is shifted to "on" position. It will be seen that aperture 82 is positioned between the pivotal point 80 and the handle 81. At the opposite end of the control arm another aperture 83 is provided, and this aperture is disposed around shaft 70 of the rotor 68. Thus when the handle 81 is shifted to the right as viewed in FIGURE 1, the shaft 70 and rotor 68 shift to vertical, operative position. When the handle 81 is shifted to the left as viewed in FIGURE 1, the shaft 70 and rotor 68 are tilted to the right, i.e., to inoperative position.

Referring now to the arrangement of the casing 10 and top plate 22, it will be seen that a space or gap exists between the flange 26 of the top plate and the right end of the casing as viewed in FIGURES 1 and 2. This gap or space is filled by the removable panel 18 which is supported on the longitudinal arm 30 and transverse arm 35 of mounting member 16. Since tone arm 20 is mounted on panel 18, it will be appreciated that the tone arm is thus effectively isolated from vibrations within the audio frequency range.

The panel 18 is releasably held in place on the mounting member by means of a permanent magnet 85 imbedded in the lower surface of the panel and by means of pins 86 depending downwardly therefrom. The permanent magnet 85 may be of any desired type. In the accompanying drawings I have illustrated a ring magnet similar to those used in the magnetic bearing assembly. The magnet is imbedded adjacent the central portion of the lower surface of the panel and is flush therewith. It engages the outer end of the longitudinal arm 30 of the mounting member 16. The mounting member is made of a suitable magnetic material such as iron, steel, or alloys thereof. Thus the magnetic force of attraction exerted between the permanent magnet and the end of the mounting member serves to releasably hold the panel 18 in place. The pins 18 project downwardly into the apertures 36 and inside the tubular grommets 34 to align and center the panel and to also retain it in place.

The panel is provided with an aperture 87 near the one end thereof to serve as a mounting hold for tone arm 20. Any desired type of tone arm may be employed. In the illustrated embodiment I have shown a tone arm similar to that disclosed in my co-pending patent application Serial No. 288,202. Thus the illustrated tone arm consists of a tubular arm 88, having a pick-up head and cartridge 89 at one end and adjustable counterweight 90 at the other end, an adjustable slide 91 for giving fine control of the tracking force, and a pivotal mounting at 92. A mounting spindle 93 is secured in the aperture 87 and is provided with an arm rest 94 on which the tone arm may be supported while not in use. The electrical leads from the cartridge 89 extend rearwardly through the tubular arm and downwardly through aperture 87 and thence to the amplifier system.

It will thus be seen that I have provided an improved turntable assembly affording stable support to the rotatable platen and in which both the platen and tone arm are effectively isolated from vibrations within the audio frequency range. It will also be seen that I have provided an improved operating and control mechanism for the platen which is of relatively simple construction; which may be readily operated to shut off the operating motor and simultaneously disconnect the rotor which serves as the transmission; and which provides for constant rotation of the platen at a uniform rate of speed while in operation.

Modifications may be made in the illustrated and described embodiment of my invention without departing from the invention as set forth in the accompanying claims.

I claim:

1. An improved phonograph turntable assembly for record discs comprising: a supporting base; a platen for supporting a record disc; a bearing assembly supporting the platen for rotary motion; a mounting member for the bearing assembly having a longitudinally extending arm engaging and supporting a portion of the bearing assembly adjacent one end thereof and having a transverse arm adjacent its opposite end, said mounting member being supported on said supporting base at three triangularly arranged spaced points by means of resilient supports extending between the mounting member and the supporting base adjacent the said one end of the mounting member and adjacent respectively opposite ends of the transverse arm; and a tone arm mounted adjacent one end of the transverse arm of the mounting member.

2. An improved turntable assembly for record discs as set forth in claim 1 in which the compliance of said resilient supports relative to the mass supported thereon is such that the natural period of vibration is outside of the audio range.

3. An improved turntable assembly for record discs comprising: a supporting base including a cabinet having a top plate formed with an opening therein and extending across the major portion of the cabinet and terminating in a downwardly extending flange having angle brackets adjacent opposite ends thereof; a platen for supporting a record disc; a bearing assembly supporting the platen for rotary motion; a mounting member for the bearing assembly having a longitudinal arm with the major portion thereof disposed in a plane beneath the top plate with a first end portion upwardly offset and extending outwardly through the opening in the top plate in a plane above the top plate and supporting a portion of the bearing assembly, said longitudinal arm having a second end portion extending outwardly beyond and beneath the flange portion of the top plate with a transverse arm secured thereto adjacent said second end portion, and said mounting member being supported on said supporting base at three triangularly spaced points by means of resilient supports extending between the first end portion of the longitudinal arm of the mounting member and the upper surface of the supporting plate and between respectively opposite end portions of the transverse arm and the angle brackets; and a removable panel for supporting a tone arm disposed in and substantially filling the space between the flange of the top plate and the opposite wall of the cabinet and resting on said second end of the longitudinal arm and on said transverse arm.

4. An improved turntable assembly for record discs as set forth in claim 3 in which one of the contacting surfaces of the panel and of the longitudinal and transverse arms is made of magnetic material and the other surface carrying a permanent magnet whereby the panel is removably retained in place.

5. An improved phonograph turntable assembly for record discs as set forth in claim 3 in which the resilient supports are tubular grommets made of an elastomeric material and the removable panel is provided with a pair of downwardly projecting pins engageable in the supporting grommets adjacent opposite ends of the transverse arm.

6. An improved phonograph turntable assembly for record discs comprising: a supporting base; a platen for supporting a record disc; a bearing assembly supporting the platen for rotary motion; a mounting member for the bearing assembly having a longitudinally extending arm engaging and supporting a portion of the bearing assembly adjacent one end thereof and having a transverse arm adjacent its opposite end, said mounting member being supported on said supporting base at three triangularly arranged spaced points by means of resilient supports extending between the mounting member and the supporting base adjacent the said one end of the mounting member and adjacent respectively opposite ends of the transverse arm; and a panel for supporting a tone arm mounted adjacent the said opposite end of the mounting member, one of the contacting surfaces of the panel and of the mounting member being made of magnetic material and the other surface carrying a permanent magnet whereby the panel is releasably retained in place.

References Cited by the Examiner
UNITED STATES PATENTS

| | | | |
|---|---|---|---|
| 2,353,763 | 7/1944 | Rodman | 274—39 |
| 3,047,297 | 7/1962 | Drake | 274—39 |
| 3,048,408 | 8/1962 | Morgan | 274—9 X |
| 3,111,323 | 11/1963 | Zimmermann | 274—9 |
| 3,198,528 | 8/1965 | Van Antwerk | 274—39 |

NORTON ANSHER, *Primary Examiner.*

CLIFFORD B. PRICE, *Assistant Examiner.*